United States Patent
Chatten et al.

(10) Patent No.: US 10,442,409 B2
(45) Date of Patent: Oct. 15, 2019

(54) VEHICLE ROOF SNOW REMOVAL

(71) Applicant: FORD GLOBAL TECHNOLOGIES, LLC, Dearborn, MI (US)

(72) Inventors: Alyssa Chatten, Royal Oak, MI (US); Erick M. Lavoie, Dearborn, MI (US); John R. Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 13 days.

(21) Appl. No.: 15/864,166

(22) Filed: Jan. 8, 2018

(65) Prior Publication Data

US 2019/0210573 A1   Jul. 11, 2019

(51) Int. Cl.
| *B60R 9/045* | (2006.01) |
| --- | --- |
| *B60S 1/66* | (2006.01) |
| *B08B 1/00* | (2006.01) |
| *B08B 7/00* | (2006.01) |

(52) U.S. Cl.
CPC ............... *B60S 1/66* (2013.01); *B08B 1/001* (2013.01); *B08B 7/0071* (2013.01); *B60R 9/045* (2013.01)

(58) Field of Classification Search
CPC ........... B08B 1/00; B08B 1/001; B08B 1/002; B08B 1/005; B08B 1/006; B08B 1/008; B08B 7/00; B08B 7/0064; B08B 7/0071; B60S 1/66; B60R 9/045
See application file for complete search history.

(56) References Cited

U.S. PATENT DOCUMENTS

| 5,464,140 | A | * | 11/1995 | Hill ..................... | B60R 9/045 224/315 |
| --- | --- | --- | --- | --- | --- |
| 5,752,635 | A | * | 5/1998 | Blankenburg ......... | B60R 9/045 211/209 |
| 6,179,179 | B1 | * | 1/2001 | Potter ................. | B60R 9/045 224/321 |
| 6,216,928 | B1 | * | 4/2001 | Blankenburg ......... | B60R 9/045 224/321 |
| 7,650,660 | B1 | | 1/2010 | Duncan, Sr. | |
| 7,783,400 | B1 | | 8/2010 | Zimler | |
| 7,921,502 | B1 | | 4/2011 | Valverde | |
| 2006/0049225 | A1 | * | 3/2006 | Blankenburg ......... | B60R 9/045 224/325 |
| 2008/0184506 | A1 | | 8/2008 | Dix et al. | |
| 2011/0099858 | A1 | * | 5/2011 | Jakus ................... | B60S 1/56 37/270 |
| 2013/0284779 | A1 | * | 10/2013 | Sautter ................ | B60R 9/048 224/323 |
| 2014/0196238 | A1 | | 7/2014 | Valverde et al. | |
| 2018/0162287 | A1 | * | 6/2018 | Ranka ................. | B60R 9/052 |
| 2018/0201198 | A1 | * | 7/2018 | Jimenez Hernandez .................. | B60R 9/045 |

(Continued)

FOREIGN PATENT DOCUMENTS

| DE | 102012108331 A1 | 3/2014 | | |
| --- | --- | --- | --- | --- |
| FR | 1127247 A | * | 12/1956 | ............. B60R 9/045 |
| FR | 1142611 A | * | 9/1957 | ............. B60R 9/045 |

(Continued)

*Primary Examiner* — Hilary L Gutman
(74) *Attorney, Agent, or Firm* — Frank L. Lollo; MacMillan, Sobanski & Todd, LLC

(57) ABSTRACT

A roof-rack for a vehicle and method of operation where the siderails and the crossbars are both automatically movable via a control circuit to clear snow from a vehicle roof.

11 Claims, 6 Drawing Sheets

(56) References Cited

U.S. PATENT DOCUMENTS

2018/0201199 A1\* 7/2018 Aftanas .................. B60R 9/045

FOREIGN PATENT DOCUMENTS

| KR | 100514047 | 9/2005 | | |
|----|-----------|--------|---|---|
| KR | 20090097972 A | 9/2009 | | |
| WO | WO-8600584 A1 \* | 1/1986 | ............. | B60R 9/045 |

\* cited by examiner

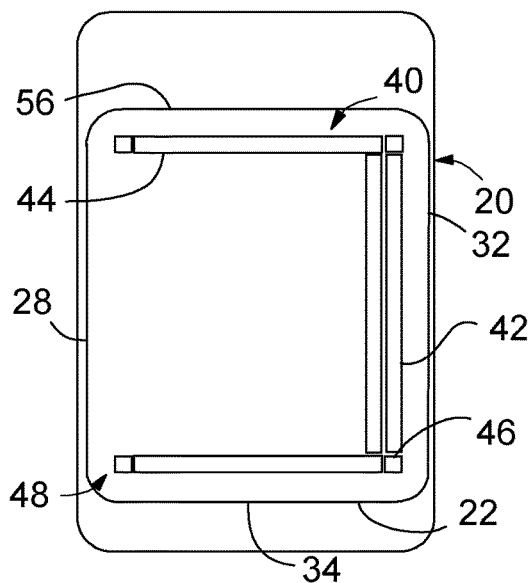
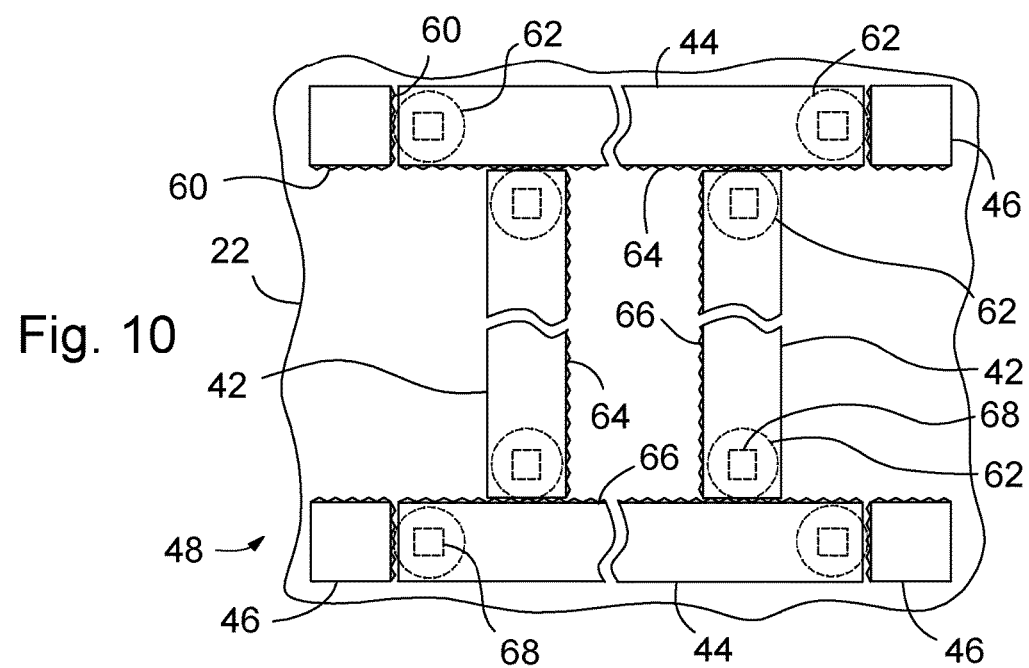
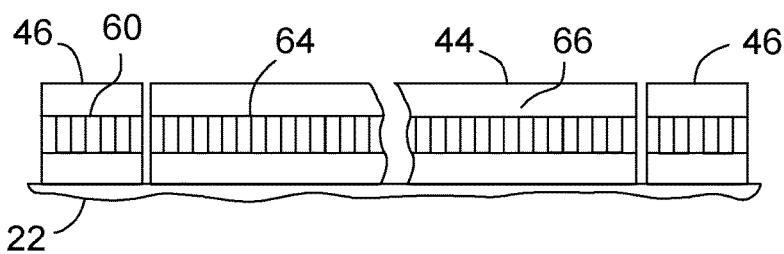

VEHICLE ROOF SNOW REMOVAL

BACKGROUND OF THE INVENTION

The present invention relates to a snow removal system for a vehicle roof and more particularly to a motorized roof rack mechanism for snow removal.

For motor vehicles, many vehicle operators have difficulty effectively removing the snow from the vehicle roof after a snow storm. This may be due to the height of the roof, having proper snow removal equipment on hand, fixed roof racks that make snow removal more cumbersome, and the time needed to remove the snow. Additionally, for vehicles used in ride sharing types of arrangements, the incentive for any one particular driver to remove the snow from the roof may be reduced.

Removal of snow may be desirable in order to, among other things, prevent the snow from sliding off the roof while driving. Accordingly, it may be desirable to have a more automated way to remove snow from the roof of a vehicle.

SUMMARY OF THE INVENTION

An embodiment contemplates a snow removal roof-rack that includes siderails and crossbars configured to support objects on a vehicle roof; anchors fixed to the roof, selectively securing the siderails and crossbars to the roof; and an apparatus engaging the crossbars, siderails and anchors to automatically and selectively move the siderails laterally and the crossbars longitudinally.

An embodiment contemplates a method of clearing snow from a vehicle roof comprising, positioning siderails for snow removal, and actuating an apparatus to slide one of the siderails laterally to push the snow off the roof.

An advantage of an embodiment is that the roof rack, while allowing for functionality as a conventional roof rack, also allows for automated removal of snow from the vehicle roof by use of roof rack components. This roof rack also allows for configurable snow removal operation with both cross bar and side rails movable for snow removal, a reliable motorized track system controllable by a user from a remote device, roof rack object detection to prohibit automated snow removal when objects are present on the roof rack, snow detection on the vehicle roof, and may include a heating function for removal by melting snow.

BRIEF DESCRIPTION OF THE DRAWINGS

FIG. 9 is a schematic view similar to FIG. 8, but with the siderails both slid laterally outward (outboard) to the passenger's side of the vehicle roof.

FIG. 10 is a schematic plan view of an apparatus, on the vehicle roof, showing interconnecting of siderails and crossbars for relative movement between them.

FIG. 11 is a schematic elevation view of a portion of a siderail of FIG. 10.

DETAILED DESCRIPTION

Figure 1:
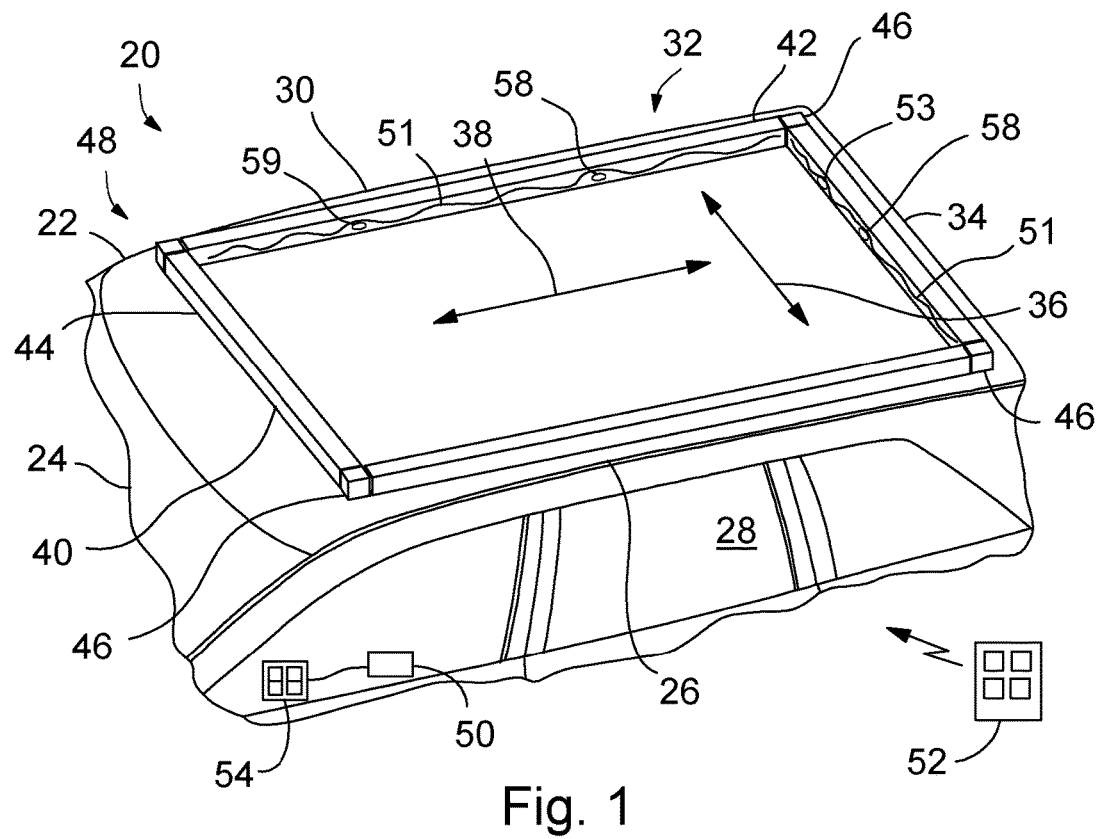
FIG. 1 is a schematic perspective view of a roof of a vehicle having a roof-rack.

FIG. 1 shows an upper portion of a passenger vehicle 20 having a roof 22. The front of the roof 22 is adjacent to a windshield 24, with the roof 22 having a first side edge 26 adjacent to a driver's side 28 of the vehicle 20 and a second side edge 30 adjacent to a passenger's side 32 of the vehicle 20. The edges 26, 30 extend back to a rear 34 of the roof 22. A first set of arrows 36 indicate a lateral (side-to-side) direction relative to the vehicle 20 and a second set of arrows 38 indicate a longitudinal (fore-aft) direction relative to the vehicle 20. For both lateral and longitudinal directions, location or movement toward the center of the vehicle roof 22 is considered to be inboard while location or movement toward the outer edges of the vehicle roof 22 are considered outboard. Also, the reference to driver's side and passenger's side is for convenience in describing the components and their operation in the present specification, and so a reversal of the driver's side/passenger's side for right-hand drive vehicles is also contemplated herein.

A roof-rack 40 includes a pair of siderails 42 extending longitudinally along the roof 22 and a pair of crossbars 44 extend laterally across the roof 22. The siderails 42 and crossbars 44 have bottoms that rub against or are very close to the roof 22, for reasons that will be explained below. The roof-rack 40 also includes anchors 46 fixed to the roof 22. These anchors 46 also cooperate with the siderails 42 and crossbars 44 to support the siderails 42 and crossbars 44 in the desired positions on the roof 22. A positioning apparatus 48, shown in other figures and discussed below, controls movement of each of the siderails 42 and each of the crossbars 44 on the roof 22. The term siderail(s) as used herein, including the claims, means a portion of a roof-rack 40 that extends in the generally longitudinal (fore-aft) direction 38 of the vehicle 20, while the term crossbar(s) as used herein, including the claims, means a portion of a roof-rack 40 that extends in the generally lateral (side-to-side) direction 36 of the vehicle 20.

The positioning apparatus 48 may include communication with and control by an electronic control circuit 50 that may include a processor, memory, software and other conventional electronic control elements. A button on a remote apparatus 52, such as a key fob and/or smart phone via an app, or one or more vehicle switches 54, such as interior switches and/or an exterior key pad may communicate with the circuit 50 in order to control movement of the siderails 42 and crossbars 44 on the roof 22. Such remote operation of a snow clearing operation may be useful as well for vehicles that are used in ride sharing applications since the vehicle owner and operator may be different individuals. The remote apparatus 52 may also include a remote engine start function, which allows for operation of the positioning apparatus 48 and/or heating elements (discussed below) when battery power alone may be insufficient under the current vehicle conditions. Such a function of the remote apparatus 52 may also include a low battery alert to a vehicle operator/owner when clearing is desired, allowing for remote engine start activation or cancelling of the snow clearing, as desired. If the vehicle is a battery electric vehicle, then the control circuit 50 may also control from which battery/electrical system the current is drawn (for example a twelve volt or a higher voltage battery/circuit) for the snow clearing operation.

Optionally, object detecting sensors 58 mounted in one or more of the siderails 42 and crossbars 44 may be in communication with the circuit 50 and alert a user when an object is mounted on the roof-rack 40 in order to avoid attempting to employ a snow clearing operation until the object has been removed. This sensor 58 may be a type of lock, where when items are mounted on the roof-rack 40 they are locked to it. The communication to the vehicle operator that this sensor 58 is locked may be communicated to a vehicle touch screen, a smart phone via an app, or by other suitable means.

Also, optionally, a snow detection sensor 59 may be mounted on the roof 22, siderail 42 or crossbar 44 to detect the presence and amount of snow on the roof 22, and provide this information to the circuit 50. This sensor may be, for example, an ultrasonic sensor, pressure sensing type of sensor, or other suitable type of sensor.

In addition, an optional set of heating elements 51 and temperature sensor 53 may be mounted in the siderails 42, crossbars 44 or both, and controlled by the circuit 50. This may be employed when the snow is particularly heavy or the temperature is very low, in which case the circuit 50 activates the heating elements 51 to begin melting some of the snow first, prior to sliding the siderails 42 or crossbars 44 to push the snow off the roof 22.

The movement of the crossbars 44 and siderails 42 may be employed to position them for mounting items on top of the vehicle 20. In addition, the movement of the crossbars 44 and siderails 42 may be employed to push snow off of the roof 22 of the vehicle 20. This may be particularly useful, for example, with minivans and sport utility vehicles with relatively high roofs since these may be more difficult for the average height person to clear snow from than a car that has a roof closer to the ground. The term automatically as used herein, including the claims, refers to controllers, mechanisms and/or apparatuses that cause or prevent movement of components, as opposed to a human moving the particular component—for example, the siderails or crossbars moving automatically means being moved by other system elements without human contact with these components to move them.

Figure 2:
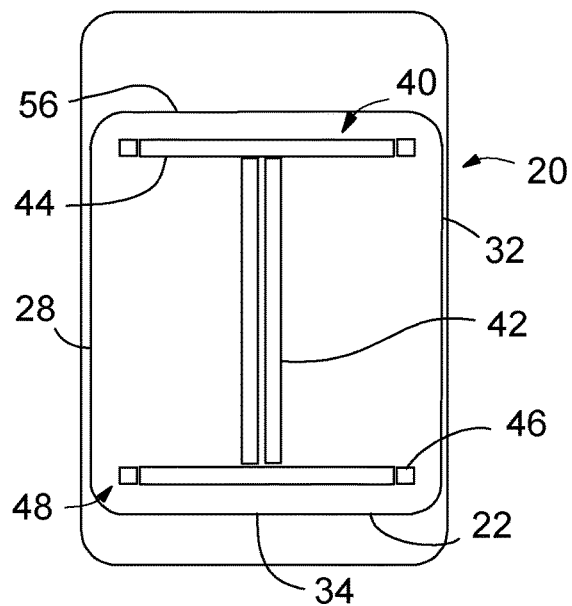
FIG. 2 is a schematic plan view looking down on a vehicle with the roof-rack having siderails at a central (inboard) position and crossbars at extended (outboard) positions.
Figure 3:
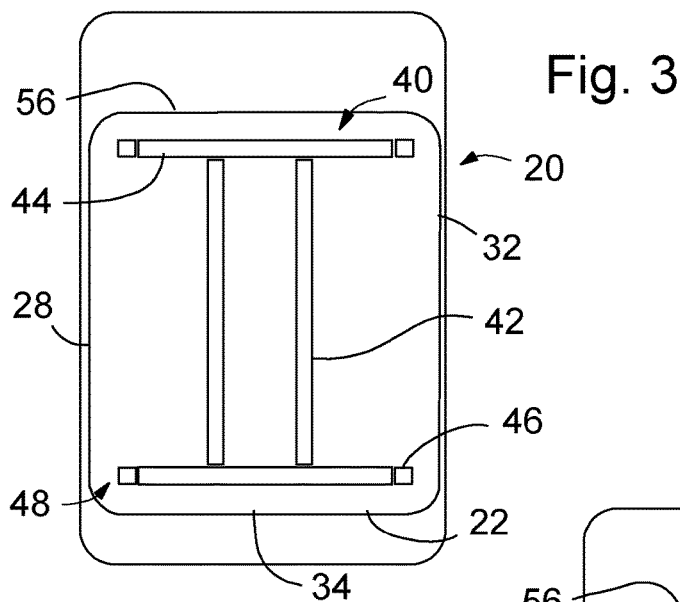
FIG. 3 is a schematic view similar to FIG. 2, but with the siderails partially slid laterally outward (outboard).

FIGS. 2-9, in conjunction with FIG. 1, illustrate ways that the components of the roof-rack 40 can be employed to remove snow from the vehicle roof 22. In FIG. 2, the vehicle 20 is parked with the positioning apparatus 48 locating both of the siderails 42 moved laterally inboard to a central rest position while the crossbars 44 are at longitudinally outboard positions adjacent to the anchors 46. Should one return to the vehicle 20 (or preparing to return to the vehicle) after a snow storm, one may activate the circuit 50 with, for example the remote apparatus 52 or vehicle switches 54 to remove the snow. Upon activation, the positioning apparatus 48 begins sliding each of the siderails 42 outboard (see FIG. 3), with the bottom and outboard side of each siderail 42 pushing the snow as they move. This motion may continue until the siderails 42 are both at outboard positions (see FIG. 4), at which point most of the snow falls off the sides 28, 32 of the roof 22. This operating mode may be preferred when one does not wish to push the snow to either the front or rear of the vehicle 20. By avoiding pushing the snow to the front 56 of the roof one avoids the snow building up on the windshield 24.

Figure 4:
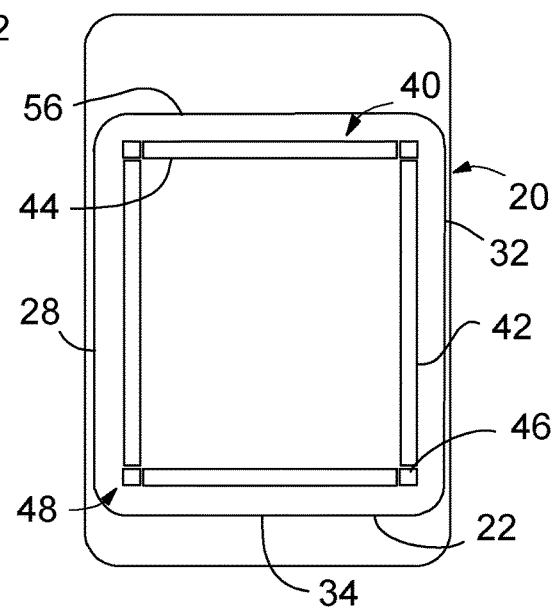
FIG. 4 is a schematic view similar to FIG. 2, but with both the siderails and the crossbars at extended (outboard) positions.
Figure 5:
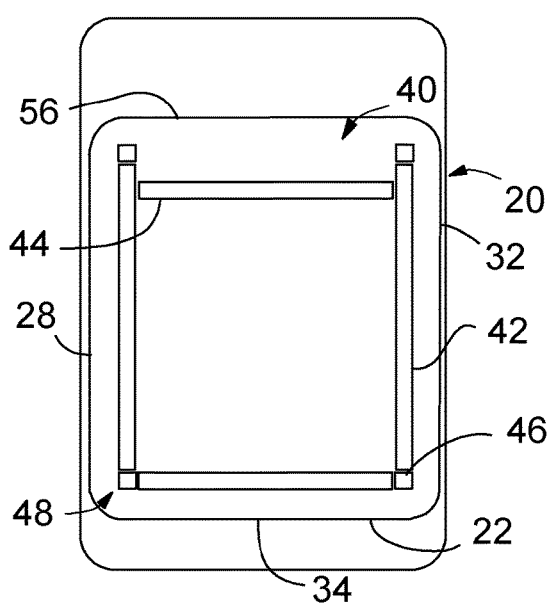
FIG. 5 is a schematic view similar to FIG. 4, but with the forward one of the crossbars partially slid longitudinally rearward.
Figure 6:
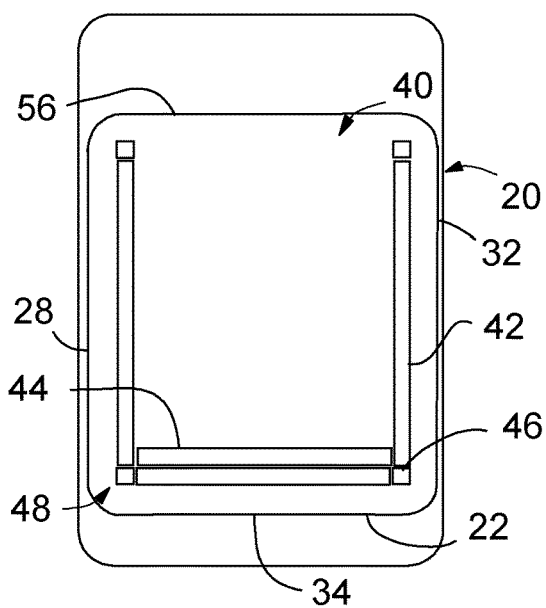
FIG. 6 is a schematic view similar to FIG. 5, but with the forward one of the crossbars slid fully longitudinally rearward.

Another mode of operation for snow removal may be one where the vehicle 20 is parked with the positioning apparatus 48 locating both the crossbars 44 and siderails 42 in their respective outboard positions adjacent to the anchors 46 (see FIG. 4). One will note that these modes of operation can be employed sequentially or selectively, as desired by the user; thus these modes are all applicable on the same vehicle since the roof-rack 40 possesses the ability to selectively and automatically move one or more siderails 42 and one or more crossbars 44 along the roof 22. Should one wish to clear the snow from the vehicle 20 after a snow storm, one may activate the circuit 50 with the remote apparatus 52 or vehicle switches 54 to remove the snow. In this instance, upon activation, the positioning apparatus 48 begins sliding the forward one of the crossbars 44 longitudinally rearward (see FIG. 5) with the bottom and rear side of the crossbar 44 pushing the snow as it moves. This motion may continue until the crossbar 44 is at a rear position against the rear one of the crossbars 44 (see FIG. 6), at which point most of the snow falls off the rear 34 of the roof 22. This operating mode may be preferred when one does not wish to push the snow to either of the sides of the vehicle 20. Alternatively, both of the crossbars 44 can be moved to forward positions, and then should the snow come down while the vehicle 20 is parked, both of the crossbars 44 can be slide rearward to the rear of the roof 22 in order to slide the snow off the rear of the vehicle 20.

Figure 7:
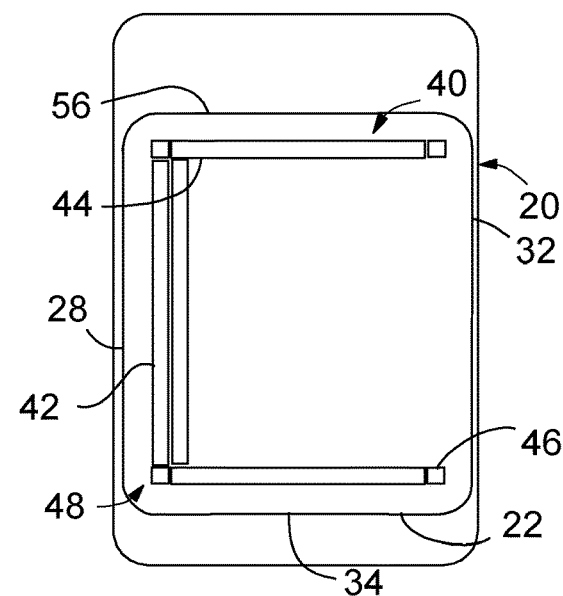
FIG. 7 is a schematic view similar to FIG. 2, but with the siderails both slid laterally outward (outboard) toward the driver's side of the vehicle roof.
Figure 8:
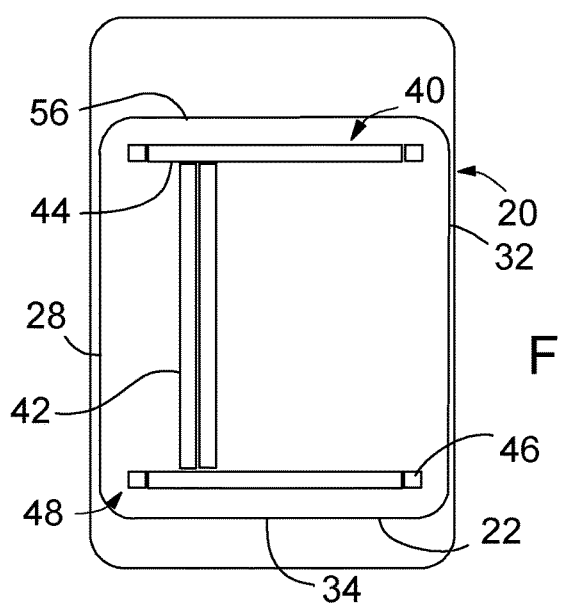
FIG. 8 is a schematic view similar to FIG. 7, but with the siderails both slid laterally partially inboard from the driver's side toward the center of the vehicle roof.
Figure 12:
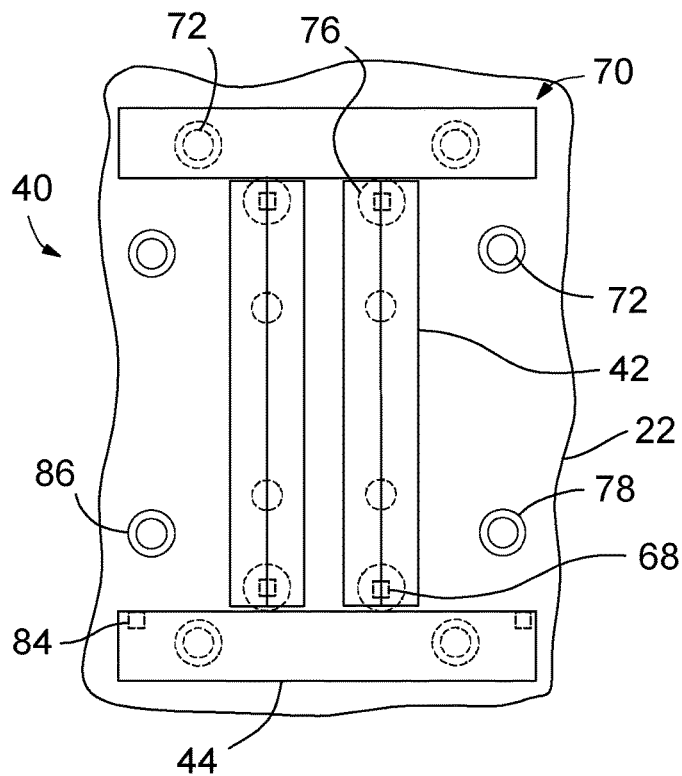
FIG. 12 is a schematic plan view of an alternative apparatus, on the vehicle roof, showing interconnecting of siderails and crossbars for relative movement between them.
Figure 13:
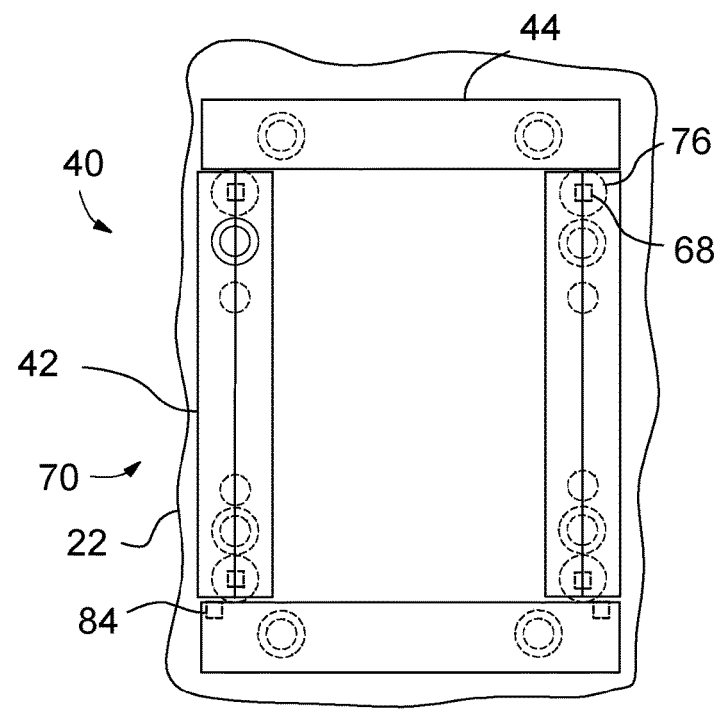
FIG. 13 is a schematic view similar to FIG. 12, but with the siderails slid laterally outward to outboard positions adjacent to the sides of the vehicle roof.
Figure 14:
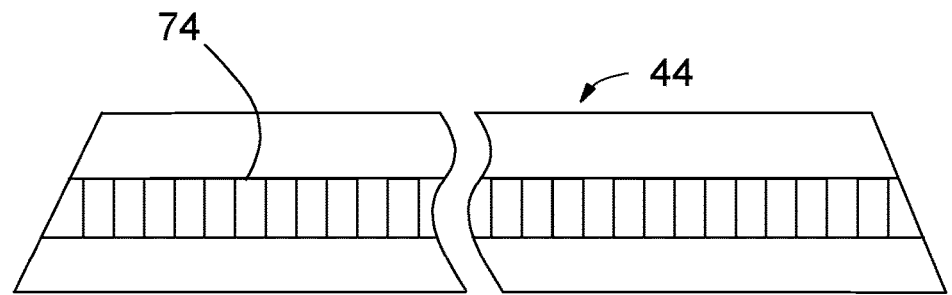
FIG. 14 is a schematic elevation view of a portion of a crossbar of the roof-rack of FIG. 12.
Figure 15:
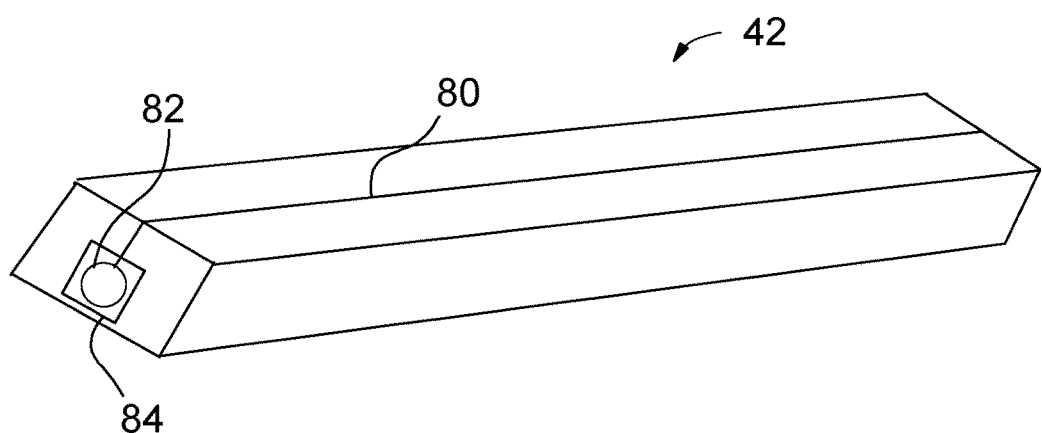
FIG. 15 is a schematic perspective view of a portion of a siderail of the roof-rack of FIG. 12.

Another mode of operation for snow removal may be one where the vehicle 20 is parked with the positioning apparatus 48 locating both siderails 42 adjacent to each other on the driver's side 28 of the vehicle 20, and the crossbars 44 in their respective outboard positions (see FIG. 7). Should one wish to remove the snow from the vehicle 20 after a snow storm, one may activate the circuit 50 with the remote apparatus 52 or vehicle switches 54 to remove the snow. In this instance, upon activation, the positioning apparatus 48 begins sliding the siderails 42 laterally toward the passenger's side 32 (see FIG. 8) with the bottom and right side of the siderails 42 pushing the snow as they move. This motion may continue until the siderails 42 are at a passenger side position (right side of roof, see FIG. 9), at which point most of the snow falls off the passenger side 32 of the roof 22. This operating mode may be preferred when one does not wish to push the snow to the driver's side 28 of the vehicle 20 because the occupant is entering the vehicle through the driver's door, and when one does not wish to push the snow to either the front or rear of the vehicle 20. By avoiding pushing the snow to the front 56 of the roof one avoids the snow building up on the windshield 24, and by avoiding pushing the snow to the rear 34 one avoids the snow being piled at a rear liftgate if one desires access, for example, to a vehicle cargo compartment.

For the various modes of operation discussed in FIGS. 2-9, after the snow is cleared, the positioning apparatus 48 may return the siderails 42 and crossbars 44 to a neutral/rest position if so desired. Such a rest position may be, for example, the position in which the elements are shown in FIG. 1. Although other positions may be employed instead if so desired. For example, the crossbars 44 and siderails 42 may be returned to the rest positions they were in just prior to clearing the snow from the roof 22. Additionally, as discussed relative to FIG. 1, for the modes of operation discussed in FIGS. 2-9, the remote engine start, for a vehicle with an engine, or battery control, for an electric vehicle, may be employed for powering the positioning apparatus 48 and heating elements 51 during snow removal operations. Additionally, if so desired, the control circuit 50 may include a control routine that may be set by the vehicle operator/owner to automatically periodically activate the positioning apparatus 48 and/or the heating elements 51 for snow removal. This periodic activation may be employed to reduce the amount of snow being removed from the roof 22 at any one time. The amount of time between activation may be a predetermined set amount of time, may be a periodic reminder sent remotely to the vehicle operator/owner at which point he or she can choose to activate the system, may be based on the output from the snow detection sensor 59, or may be a combination of these operations.

FIGS. 10 and 11, in conjunction with FIG. 1, show an example of a positioning apparatus 48 that may be employed to move the siderails 42 and crossbars 44 in the various snow removal operations described above. Each of the anchors 46, which as discussed above are fixed to the roof 22, includes a pair of racks 60, a first rack facing laterally inboard that can engage with the crossbars 44 and a second rack facing longitudinally inboard that can engage with the siderails 42.

Each of the cross bars 44 and siderails 42 have a pair of pinion gears 62 near their respective ends, with each pinion 62 mating with a respective rack 60 of the anchors 46. Thus, for example, when the siderails 42 and crossbars 44 are in the position shown in FIG. 1, the front crossbar 44 has a first pinion 62 mating with the front driver's side anchor's rack 60 and a second pinion 62 mating with the front passenger's side anchor's rack 60. This same arrangement is true for the rear crossbar 44 as well as both siderails 42.

In addition to the racks 60 on the anchors 46, each of the crossbars 44 and siderails 42 have racks 64 on inboard facing surfaces 66 that are also matable with the pinions 62. As a result, the pinions 62s are matable with and can engage the racks 60, 64 on both the anchors 46 and the siderails 42 and crossbars 44.

At least one of each pair of pinions 62 is driven by a motor 68. Each motor 68 is controlled and actuated by the control circuit 50 to rotate in a first direction or a reverse direction.

Thus when, for example, the motor 68 driving at least one of the pinions 62 on the forward crossbar 44 is activated, the pinions 62 will engage the racks 60 (if all of the way in a forward position) and the racks 64 on the siderails 42 (if more rearward) to slide the forward crossbar 44 rearward along the roof 22 toward the rearward crossbar 44. Such a movement may be used during a snow removal mode as discussed above relative to FIGS. 4-6. When the circuit 50 reverses this motor's direction (or two motors reverse direction if each pinion has its own motor), then the forward crossbar 44 will slide forward along the racks 64 of the siderails 42 until engaging with the racks 60 on the forward anchors 46, at which point the motor 68 is deactivated. The motor 68 can be deactivated anywhere along this path of travel for the forward crossbar 44, if so desired, for positioning the crossbar 44 for cargo support.

Motors 68 engaged with the pinions 62 on the other crossbar 44 and siderails 42 may be slid along their respective racks 60, 64 in a manner similar to that just described for the forward crossbar 44.

Moreover, multiple motors 68 may be actuated at the same time to move either both crossbars 44 or both siderails 42 at the same time. For example, when the motors 68 driving at least one of the pinions 62 on each of the siderails 42 are activated, the pinions 62 will engage the racks 60 to slide the siderails 42 in the same direction laterally. Such a movement may be used during a snow removal mode as discussed above relative to FIGS. 7-9. If one then wishes to return to a roof-rack rest position (such as for example that shown in FIG. 1), then the motor(s) 68 for the siderail 42 on the passenger side remains deactivated, while the motor 68 (or motors if each pinion has its own motor) for the siderail 42 on the driver's side is activated in an opposite direction to return it to the driver's side of the vehicle roof 22.

With this configuration, one will note that to move the crossbars 44 inboard and outboard, the siderails 42 are at their outboard-most positions. This allows for movement of the crossbars 44 without interference from the siderails 42 and also provides for support and securement of the crossbars 44 due to the pinions 62 of the crossbars 44 being in engagement with one or the other of the racks 60, 64 at all times. The same is true for the siderails 42, in which case the crossbars 44 are at their outboard-most positions. This allows for movement of the siderails 42 without interference from the crossbars 44 and also provides for support and securement of the siderails 42 due to the pinions 62 of the siderails 42 being in engagement with one or the other of the racks 60, 64 at all times.

FIGS. 12-15, in conjunction with other figures discussed above, show another example of a positioning apparatus 70 that may be employed to move the siderails 42 and crossbars 44 in the various snow removal operations described above. Anchors 72, a pair for each siderail 42 and crossbar 44, are fixed to the roof 22. The anchors 72 along the sides of the roof 22 are employed to selectively engage and secure the siderails 42 when the siderails 42 are in their outboard-most positions. The anchors 72 along the front and rear of the roof 22 selectively engage and secure the crossbars 44 when the crossbars 44 are in their outboard-most positions. Thus, under the various modes of operation, either the siderails 42 or the crossbars 44 or both are in their outboard-most positions in order to assure that the roof-rack 40 is always secured to the roof 22.

Locks 78 may be activated to actuate the anchors 72 to selectively secure and release the siderails 42 and crossbars 44. Sensors 86 associated with each anchor 72 may detect when a corresponding siderail 42 or crossbar 44 is at its outboard-most position and automatically cause the locks 78 to lock that particular member in place (this may be controlled by the control circuit 50). The control circuit 50 may override the locking signal when a motor 68, 84 is about to be activated to slide that particular member 42, 44 along the roof 22.

The crossbars 44 each include a rack 74 facing longitudinally inboard that can engage with pinion gears 76 on the siderails 42. Motors 68 engage the pinions 76 to control the movement of the pinions 76. Thus, the motors 68 may be actuated to slide the siderails 42 laterally across the roof 22.

The top of each siderail 42 includes a track 80, within which corresponding connectors 82 of the crossbars 44 slide. The connectors 82 are actuated by motors 84 in order to be selectively slidable along the tracks 80. Thus, the motors 84 may be actuated to slide the crossbars 44 longitudinally across the roof 22.

The inboard sides and the ends of each of the siderails 42 and crossbars 44 may be angled to allow for sliding of the crossbars 44 along the siderails 42 and of course to allow for sliding of the siderails 42 along the crossbars 44 without interference.

By activating the control circuit 50 with the remote apparatus 52 or vehicle switches 54, the motors 68, 84 and locks 78 can be controlled to move the siderails 42 and crossbars 44 for snow removal, as discussed above relative to FIGS. 2-9.

While certain embodiments of the present invention have been described in detail, those familiar with the art to which this invention relates will recognize various alternative designs and embodiments for practicing the invention as defined by the following claims.

The invention claimed is:

1. A snow removal roof-rack comprising:
siderails and crossbars configured to support objects on a vehicle roof;
anchors fixed to the roof, selectively securing the siderails and crossbars to the roof; and
an apparatus engaging the crossbars, siderails and anchors to automatically and selectively move the siderails laterally and the crossbars longitudinally.

2. The roof-rack of claim 1 wherein the apparatus includes racks on inboard surfaces of the anchors, siderails and crossbars, and each of the siderails and crossbars includes a pair of pinions that mate with corresponding racks.

3. The roof-rack of claim 2 wherein the apparatus includes motors drivingly engaging at least one pinion of each of the crossbars and siderails.

4. The roof-rack of claim 3 including a controller selectively actuating the motors to selectively cause movement of the siderails and crossbars.

5. The roof-rack of claim 1 wherein the apparatus includes motors drivingly engaging the crossbars and siderails to selectively move the siderails laterally and the crossbars longitudinally.

6. The roof-rack of claim 1 wherein the anchors are located at outboard-most ends of the siderails and crossbars when the siderails and crossbars are in outboard-most positions on the roof.

7. The roof-rack of claim 1 wherein the anchors are located under the siderails and crossbars when the siderails and crossbars are in outboard-most positions on the roof.

8. The roof-rack of claim 1 including object detection sensors communicating with a controller to selectively prevent siderail and crossbar movement when the objects are detected mounted on the roof-rack.

9. The roof-rack of claim 1 including a snow sensor that detects snow accumulation on the roof.

10. The roof-rack of claim 1 including a temperature sensor and heating elements mounted to the siderails and crossbars, and a control circuit to communicate with the temperature sensor and selectively activate the heating elements to melt snow on the roof.

11. The roof-rack of claim 1 wherein the apparatus includes sensors to detect when the siderails are in outboard-most positions and selectively lock the siderails to the anchors.

* * * * *